(12) United States Patent
Ward et al.

(10) Patent No.: US 7,290,668 B2
(45) Date of Patent: Nov. 6, 2007

(54) BICOMPONENT FIBER WICK

(75) Inventors: Bennett Clayton Ward, Midlothian, VA (US); David B. Harris, Chester, VA (US); Jian Xiang, Midlothian, VA (US); Thomas E. Harris, Jr., Hopewell, VA (US)

(73) Assignee: Filtrona Richmond, Inc., Colonial Heights, VA (US)

( * ) Notice: Subject to any disclaimer, the term of this patent is extended or adjusted under 35 U.S.C. 154(b) by 378 days.

(21) Appl. No.: 10/790,494

(22) Filed: Mar. 1, 2004

(65) Prior Publication Data
US 2005/0189292 A1   Sep. 1, 2005

(51) Int. Cl.
*B01D 24/00* (2006.01)
*B01D 39/00* (2006.01)
*B01D 61/00* (2006.01)

(52) U.S. Cl. .................. 210/508; 210/505; 210/500.1; 428/373; 428/383; 428/903; 428/296; 604/378

(58) Field of Classification Search ................ 210/502, 210/505–506, 508, 645, 501, 500.1; 428/373, 428/903, 296, 297, 408; 422/99, 101; 442/61, 442/361, 364, 360; 55/527; 96/364; 604/378, 604/379
See application file for complete search history.

(56) References Cited

U.S. PATENT DOCUMENTS

| | | | |
|---|---|---|---|
| 2,936,482 A | 5/1960 | Kilian | |
| 3,176,345 A | 4/1965 | Powell | |
| 3,192,562 A | 7/1965 | Powell | |
| 3,457,341 A | 7/1969 | Duncan et al. | |
| 3,852,224 A * | 12/1974 | Bridgeford | .................. 264/49 |
| 4,117,194 A | 9/1978 | Barbe et al. | |
| 4,173,504 A | 11/1979 | Tomioka et al. | |
| 4,217,321 A | 8/1980 | Campbell | |
| 4,270,962 A | 6/1981 | Sugihara et al. | |
| 4,286,005 A | 8/1981 | Berger | |
| 4,354,889 A | 10/1982 | Berger | |
| 4,476,186 A * | 10/1984 | Kato et al. | ..................... 442/60 |
| 4,774,039 A * | 9/1988 | Wrasidlo | ..................... 264/41 |
| 5,162,074 A | 11/1992 | Hills | |

(Continued)

FOREIGN PATENT DOCUMENTS

DE   19923344   11/2000

(Continued)

OTHER PUBLICATIONS

"New Concepts in Melt-Blown Design Applied to", Eckhard, Schwartz Biax-Fiberfilm Corp., Mar. 1987, pp. 206-220.

(Continued)

*Primary Examiner*—Ana Fortuna
(74) *Attorney, Agent, or Firm*—Hunton & Williams LLP

(57) ABSTRACT

A bicomponent fiber wick is provided for use in processing an analyte fluid. The bicomponent fiber wick comprises a self-sustaining, fluid transmissive body comprising a plurality of bundled, crimped, bicomponent fibers bonded to each other at spaced apart contact points. Each bicomponent fiber has a fiber structure comprising a first fiber component formed from a polyamide material and a second fiber component. The fibers collectively define tortuous fluid flow paths through the fluid transmissive body, the fiber structure being configured for controlling flow of the analyte fluid through the fluid transmissive body with at least a portion of the first fiber component in contact with the analyte fluid.

9 Claims, 3 Drawing Sheets

U.S. PATENT DOCUMENTS

| | | | |
|---|---|---|---|
| 5,445,884 A | 8/1995 | Hoyt et al. | |
| 5,509,430 A | 4/1996 | Berger | |
| 5,607,766 A | 3/1997 | Berger | |
| 5,620,641 A | 4/1997 | Berger | |
| 5,633,082 A | 5/1997 | Berger | |
| 5,656,448 A | 8/1997 | Jemo et al. | |
| 5,667,976 A | 9/1997 | Tabone et al. | |
| 5,747,394 A * | 5/1998 | Hassenboehler et al. | 442/328 |
| 6,074,869 A | 6/2000 | Pall et al. | |
| 6,103,181 A | 8/2000 | Berger | |
| 6,589,892 B1 * | 7/2003 | Smith et al. | 442/414 |
| 6,686,303 B1 * | 2/2004 | Haynes et al. | 442/327 |
| 6,692,541 B2 * | 2/2004 | Carlson et al. | 8/499 |
| 6,746,976 B1 * | 6/2004 | Urankar et al. | 422/155 |
| 6,867,346 B1 * | 3/2005 | Dopps et al. | 604/378 |
| 6,998,512 B2 * | 2/2006 | Wahlstrom et al. | 604/378 |
| 7,070,640 B2 * | 7/2006 | Chung et al. | 55/487 |
| 7,081,423 B2 * | 7/2006 | Abed et al. | 442/361 |
| 2002/0155029 A1 | 10/2002 | Mink et al. | |

FOREIGN PATENT DOCUMENTS

| | | |
|---|---|---|
| GB | 2036115 | 11/1979 |
| WO | WO 96/39054 | 12/1996 |

OTHER PUBLICATIONS

"Bicomponent Fibers: A Personal Perspective", IFJ, Jun. 1998, pp. 26-42.

*Textured Yarn Technology*, "Production, Properties and Processing," Monsanto Co., 1967, pp. 13-14, 17.

"Fundamentals of Fibre Formation, The Science of Fibre Spinning and Drawing", Ziabicki, pp. 366-373, 386.

* cited by examiner

BICOMPONENT FIBER WICK

BACKGROUND OF THE INVENTION

The invention relates generally to hygroscopic wicks and, more particularly, to bicomponent fiber wicks that may be adapted for transmitting analyte fluids in assay devices.

Various assay devices are known for use in the home, office, clinic, hospital or doctor's surgery for providing an analytical result which is rapid and which requires a minimal degree of skill and involvement by the user. Examples of this are the test devices or assays for pregnancy and fertile period (ovulation). Typically in such devices the number of operations in getting the results should be minimized.

Typical assay devices comprise a housing, a reaction medium positioned in the housing, upon which the assay chemistry occurs, and a wick for collecting the liquid to be assayed and transferring it to the reaction medium. In general, the assay device should merely require that a collection portion of the device be contacted with a sample (e.g., a urine sample for pregnancy testing), and thereafter no further user actions are required. The sample is carried from the collection portion to the reaction medium via the wick. Observation of changes to the reaction medium or a substrate carrying the reaction medium provide an analytical result. Ideally, the analytical result should be observable within a matter of minutes following sampling.

The actual analytic techniques used to obtain the results typically determine the presence or absence of and/or quantify the amount of various analytes in tissues and fluids of organisms. Currently most diagnostic testing is done with blood, urine, fecal material, saliva, or tissue biopsy. Testing based on these materials, however, entails substantial invasion of privacy and poses a significant safety hazard (particularly with the testing of blood). Improved assay devices are required that allow for greater speed and control of the transport and analysis of the fluid sample. These devices will depend on improved wick materials and structures.

SUMMARY OF THE INVENTION

The present invention provides wicks that make use of bicomponent fibers in which at least one of the fiber components a polyamide material. An illustrative aspect of the invention provides a bicomponent fiber wick for use in processing an analyte fluid. The bicomponent fiber wick comprises a self-sustaining, fluid transmissive body comprising a plurality of bundled, crimped, bicomponent fibers bonded to each other at spaced apart contact points. Each bicomponent fiber has a fiber structure comprising a first fiber component formed from a polyamide material and a second fiber component. The fibers collectively define tortuous fluid flow paths through the fluid transmissive body, the fiber structure being configured for controlling flow of the analyte fluid through the fluid transmissive body with at least a portion of the first fiber component in contact with the analyte fluid.

BRIEF DESCRIPTION OF THE DRAWING

The invention can be more fully understood by reading the following detailed description together with the accompanying drawing, in which like reference indicators are used to designate like elements, and in which.

DETAILED DESCRIPTION OF THE INVENTION

Figure 1:
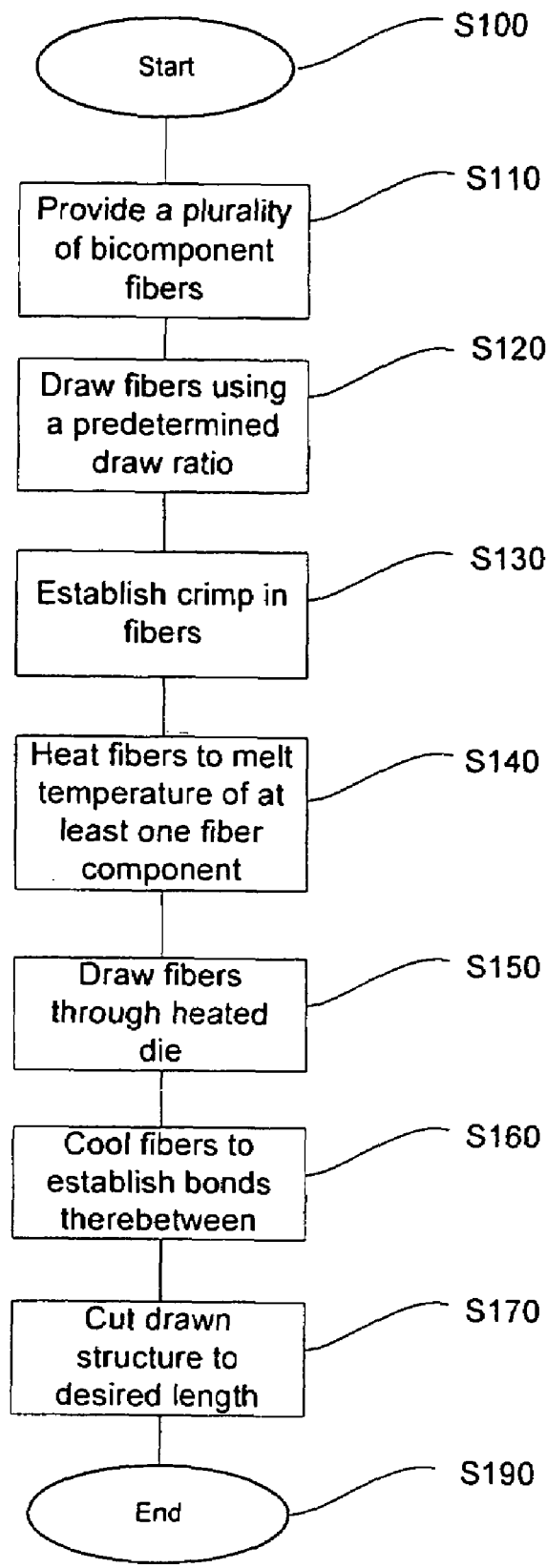
FIG. 1 is a flow diagram of a process for manufacturing a bicomponent fiber wick according to an embodiment of the invention.

The present invention provides bicomponent fiber wicks that are particularly adapted for use in devices requiring rapid, controlled transport of fluids. They are particularly adaptable for use in assay devices requiring transport of analyte fluids. As used herein the term analyte fluid means a fluid sample that is to be analyzed for the presence of one or more analytes in the fluid sample and/or to quantify the amount of one or more analytes present in the fluid sample.

The wicks of the present invention are formed from bicomponent fibers the structure and material constituents of which may be tailored to provide specific fluid transport properties for particular analytes and analyte fluids.

Bicomponent fibers have been used to some extent in wicks and medical assay devices. Most prior art assay devices, however, are constructed from low cost mono-component fibers formed from such materials as low density polyethylene (LDPE), polypropylene(PP) high density polyethylene (HDPE), ultra-high molecular weight polyethylene (UHMW), polypropylene (PP), polyvinylidene fluoride (PVDF), polytetrafluoroethylene (PTFE), polyester, and polyethersulfone (PES). It has generally been found that certain materials such as nylon 6 may be usable and, in fact may be desirable for their natural hydrophilic behavior. However, the use of nylon materials have not been favored in such mono-component applications in part due to their cost. It has also been found that non-woven hydrophilic structures formed from nylon are often not self-sustaining. Further, nylon processing often requires additional procedures to avoid inadvertent moisture absorption by the nylon fibers. In some instances, this may require a dedicated drying process. Finally, the physical and mechanical properties of spun nylon fibers are subject to changes over time (aging effects).

The more typical, less expensive polymers such as polyolefins and polyesters that are presently used to form assay device wicks have two disadvantages: (1) They often require an additional material such as a surfactant in order to provide adequate fluid transfer performance; and (2) unless functionalized, derivatized or modified, they do not provide a reactive platform for other additives. As a result of these deficiencies, the potential use of nylon as a naturally hydrophilic wick material was investigated. The wick embodiments of the present invention make use of bicomponent fibers with natural hydrophilic properties due to the use of polyamide materials in the fiber structure. The structure of these fibers are adapted to provide an optimum polyamide material amount while maintaining the desired flow characteristics for the final wick product.

The use of bicomponent fibers in hydrophilic structures, generally, is well known in the art. For example, U.S. Pat. No. 5,607,766 issued Mar. 4, 1997, U.S. Pat. No. 5,620,641 issued Apr. 15, 1997, and U.S. Pat. No. 5,633,082 issued May 27, 1997, all of which are incorporated herein by reference in their entirety, disclose the manufacture and use of bicomponent fibers comprising a core of a thermoplastic material covered by a sheath of polyethylene terephthalate. These patents note that such fibers are particularly useful in the production of elongated, highly porous elements such as in the wicks used to transport bodily fluids to a test site in a diagnostic device.

The prior art does not, however, disclose wick structures formed from bonded, crimped bicomponent fibers having at least one polyamide-based component. The wick embodiments of the present invention are self-sustaining structures formed from such fibers. The term "bicomponent" as used herein refers to the use of two polymers of different chemical nature placed in discrete cross-sectional areas of a fiber structure. The two polymers are arranged in substantially constantly positioned distinct zones across the cross-section of the bicomponent fibers that extend continuously along the length of the bicomponent fibers. While other forms of bicomponent fibers are possible, the more common bicomponent fiber types are of the "side-by-side" and "sheath-core" types. The first type is so-named because the two polymer materials literally form a side-by-side cross-sectional configuration. In "sheath-core" bicomponent fibers, a sheath of one polymer material is spun to completely cover and encompass a core of another polymer material, typically a low shrinkage, high strength thermoplastic polymeric material.

The wick structures of the present invention may be formed from either side-by-side or sheath-core bicomponent fibers that include at least one polyamide fiber component. The polyamide fiber component may be selected from the group consisting of nylon 6, nylon 6,6, nylon 4, nylon 610, nylon 11, and nylon 12, or copolymers of any of the various nylons with hydrophilic moieties, such as polyethylene glycol and/or poly(ethylene oxide) diamines. In some instances, both bicomponent fiber components may be polyamides selected from the group listed above.

The polymer or polymers of the second fiber component may depend on the bicomponent fiber type. In side-by-side fibers, a first fiber component may be formed from a polyamide material and a second fiber component may be formed from a material selected from a group including but not limited to polyolefins, polyesters, polyamides, polysulfones, etc. In sheath-core fibers, the sheath component may be formed from a polyamide material while the core component may be formed from a thermoplastic polymer material selected from a group including but not limited to polyamides (such as nylon 6, nylon 6,6 and other nylons) polyesters (such as polyethylene terephthalate, polybutylene terephthalate, polypropylene terephthalate and polylactic acid) and polyolefins (such as syndiotactic, isotactic polypropylene and polyethylene).

It will be noted from the above that both side-by-side and sheath-core bicomponent fiber types may have a first component of one polyamide material and a second component of a another polyamide material. Thus, wick embodiments of the invention could, for example, be formed from sheath-core fibers having a core component of nylon 6 and a sheath component of nylon 6,6.

As will be discussed in more detail hereafter, it has been found that the fiber material content and the fiber structure of both sheath-core and side-by-side fiber types has a significant impact on certain properties of the final wick product. It has also been found that fiber material content and fiber structure may be selected to provide desired wick properties and, in fact, may be optimized based on various design criteria.

The bicomponent fibers used in embodiments of the invention may be produced by a number of common techniques. Among such techniques are conventional melt spinning processes in which molten polymer is pumped under pressure to a spinning head and extruded from spinneret orifices into a multiplicity of continuous fibers. Melt spinning is only available for polymers having a melting point temperature less than its decomposition temperature, such as nylon, polypropylene and the like, whereby the polymer material can be melted and extruded to fiber form without decomposing. Other polymers, such as acrylics, cannot be melted without blackening and decomposing. Such polymers can be dissolved in a suitable solvent (e.g., acetate in acetone) of typically 20% polymer and 80% solvent. In a wet spinning process, the solution is pumped at room temperature through the spinneret, which is submerged in a bath of liquid (e.g., water) in which the solvent is soluble to solidify the polymeric fibers. It is also possible to dry spin the fibers into hot air, rather than a liquid bath, to evaporate the solvent and form a skin on the fiber surface. Other common spinning techniques may also be used.

After spinning, the fibers are commonly attenuated by withdrawing them from the spinning device at a speed faster than the extrusion speed. The fibers may be attenuated by taking them up on nip rolls rotating at a speed faster than the rate of extrusion or between nip rolls operating at different speeds. Depending on the nature of the polymer, drawing the fibers in this manner can make them stronger by making them more crystalline.

Attenuation can also be effected through the use of a melt blowing process. In this process, the fibers are attenuated by contacting them with a fluid such as high velocity air as they emanate from the spinneret orifices. The effect of the fluid is to draw the fibers into fine filaments. These filaments may be collected as an entangled web of fibers on a continuously moving surface such as a conveyor belt or a drum surface, for subsequent processing. This process, known as "melt blowing," is of particular commercial importance in the production of many products because of its ability to attenuate the fibers while they are still molten.

Any of the above processes may be used to produce bicomponent fibers for use in wicks of the present invention. It will be understood by those of ordinary skill in the art that the actual process used for a given fiber may depend on the fiber components and configuration. Regardless of the manner of forming the bicomponent fibers, they are subsequently gathered together and passed through one or more processing stations in which the fibers are bonded and formed to produce a continuous, self-sustaining, porous wick element of constant cross-section.

The wick element may then be further treated and/or divided into individual wick elements, each wick element being a self-sustaining structure formed as a network of continuous, bonded fibers. This network of fibers provides a tortuous interstitial path for passage of fluids by capillary action and for interstitial entrapment of loaded substances and/or substances entrained in fluids passing therethrough.

With reference to FIG. 1, a manufacturing process for forming bicomponent fiber wick elements according to an embodiment of the invention will now be discussed in more detail. The process begins at S100 and at S110, a plurality of bicomponent fibers having at least one polyamide fiber component are provided. Individual fibers are typically provided on separate bobbins from which they may be drawn through a feed roll. The fibers may alternatively be provided as a tow, or as a melt blown, spun bond, or combination non-woven roving. At S120, the fibers may be drawn through a temperature and humidity controlled draw box where the fibers are heated and stretched using a predetermined draw ratio. In an illustrative embodiment, the predetermined draw ratio may be in a range of about 1.5 to 1 to about 6 to 1 and is preferably in a range of about 2.5 to 1 to about 3.5 to 1.

At S130, a crimp may be established in the fibers. Prior to crimping, the gathered fibers form a plurality of continuous, linear fiber elements. Crimping the fibers causes them to become multidimensional and has the effect of increasing the bulk and loft of the final wick product. Moreover, crimping increases the uniformity of the wick body structure and, in particular, the capillaries that make up the tortuous fluid paths through the wick product. Crimping may be accomplished by mechanical means or, with certain bicomponent fiber configurations, by inducing a self-crimping action. Mechanical crimping can be applied to any fiber type and tends to produce a zigzag or sawtooth-shaped pattern as viewed from the side and/or from above the fiber. Any suitable mechanical crimping process may be used in the practice of the present invention.

Self-crimping fibers are generally bicomponent fibers in which the two fiber components have different shrinkage/expansion characteristics. Usually, one of the fiber components (typically the core component in sheath-core fibers) has a higher melt temperature, lower shrinkage and higher strength than the second component. When a self-crimping fiber is heated and then allowed to relax, the difference in behavior of the two components causes the fiber to deform, or crimp, in a predictable manner. Through selection of the component materials and the cross-sectional geometry of the two fiber components, a desired three-dimensional deformation may be introduced.

Figure 2:
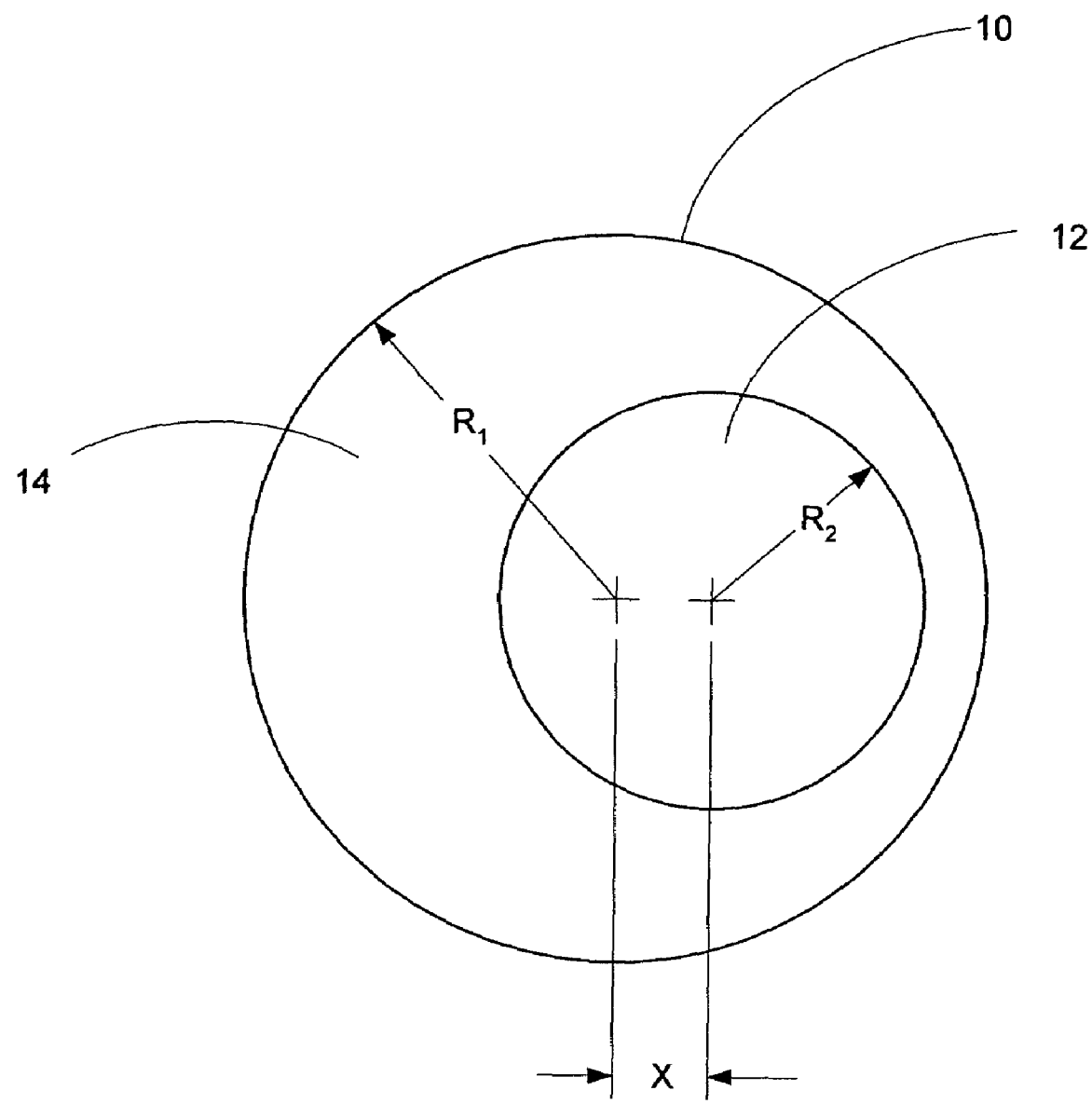
FIG. 2 is a cross-sectional view of a sheath-core bicomponent fiber that may be used in embodiments of the invention.

In both side-by-side and sheath-core bicomponent fibers, the self-crimping action of the fiber will be affected by the materials used in the fiber components and by the relative cross-sectional areas of the two components. A cross-section of a particularly preferred form of self-crimping fiber is illustrated in FIG. 2. As shown, the fiber 10 is a sheath-core fiber in which the cross-sections of the core component 12 and the sheath component 14 are both substantially circular (with outer radii $R_1$ and $R_2$, respectively) but are not concentric. Such fibers may be referred to as eccentric sheath-core fibers. The eccentricity of the fiber may be defined as the ratio of the offset X between the centers of the two components and the outer radius of the fiber, which is equal to the outer radius $R_1$ of the sheath component. The degree of eccentricity and the relative cross-sectional areas of the two components may be varied to change the degree of deformation when the fibers are allowed to crimp. Fibers used in the wicks of the present invention typically have an eccentricity in a range from about 0.1 to about 0.5.

If self-crimping fibers are used in the process of FIG. 1, the action of establishing crimps in the gathered fibers may include passing the fibers through a drawing section to stretch the fibers and then through the turbulent region of an air jet where they are allowed to relax and take on a typical self-crimped fiber pattern. This multi-dimensional fiber deformation results in intermingling of the gathered fibers, which is desirable in the downstream formation of a self-sustaining wick.

At S140, the intermingled, crimped fibers are drawn through an oven or other heating device in which the temperature is at or near the melt temperature of at least one of the two fiber components. In a preferred embodiment in which the fiber is a sheath-core fiber, the oven temperature is set at or near the melt temperature of the polyamide sheath material to at least partially melt the sheath material. The environment within the oven is carefully controlled to assure even heating of the fibers. At S150, the intermingled fibers are drawn through a heated sizing die, which causes the intermingled, crimped fibers to make contact with one another at various spaced-apart points along the length of the melted fiber component. Upon cooling at S160, the fibers remain bonded at these contact points, thereby producing a self-sustaining fiber structure. The fibers may be allowed to cool under ambient conditions or may be cooled by passing the drawn fiber structure through a subsequent cooling die, by applying chilled air, or by applying a cooler fluid, depending on the specifics of the process. In a preferred embodiment in which the fibers are sheath-core fibers, the fiber structure bonds are formed at various interspersed points along the polyamide sheath portions of the fibers.

Figure 3:
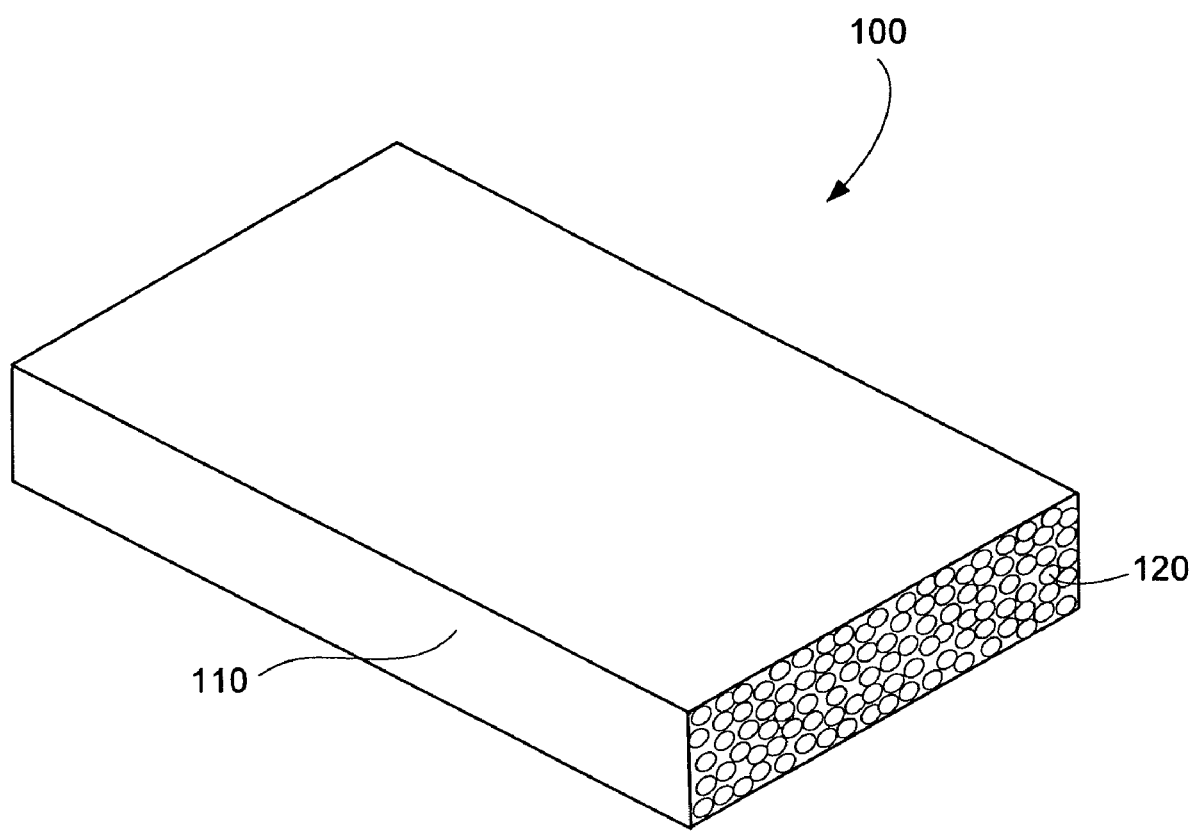
FIG. 3 is a not-to-scale perspective view of a bicomponent fiber wick according to an embodiment of the invention.

At this point in the process, the crimped bicomponent fibers have been formed into a continuous wick body structure. Though typically rectangular, it will be understood that the cross-section of the continuous wick body may be of any geometric shape. The continuous wick body structure may be cut into desired lengths to form discrete wick bodies at S170. An exemplary final product wick 100 is represented in FIG. 3 (not to scale). The wick 100 has a rectangular fluid transmissive wick body 110 formed from generally aligned but three dimensionally intermingled, bonded, crimped, bicomponent fibers 120. The process ends at S190.

In some instances, it may be desirable that the final wick product be loaded or coated with an additive material. Typical additive materials may include, for example, blocking agents, surfactants and reactive agents. Additives may be incorporated by coating or immersing the wick body structure with an additive solution before or after cutting. In a particular embodiment, a pump may be used to apply an additive in a solution to the formed wick element. The amount of an additive applied to the wick may be controlled through the concentration of the additive in the solution, the pump rate and the speed of the wick through the solution. A stripping die may be used to remove excess additives. The wick structure may then be dewatered by means generally known in the art.

Like all wick embodiments of the invention, the final product of the method described above is a self-sustaining network of bonded bicomponent fibers. This network defines a tortuous flow path for passage of fluids through the wick. As is known, a structure so-formed may provide a means of transporting a fluid with no flow impetus other than capillary action. The degree of capillary action, and thus, the flow rate for a given fluid is determined by the degree of surface energy at the boundaries of the interstitial capillaries through the fiber structure. Absent the use of enhancing additives such as surfactants, capillary surface energy will be determined by the polymer materials used in the fibers. The overall fluid transfer performance of the wick may also be affected by the uniformity of the intermingled fiber structure established by crimping the fibers.

As previously noted, polyamide materials—and in particular, nylon—are naturally hydrophilic (i.e., have a naturally high surface energy when compared to other common fiber forming materials such as polyolefins and polyesters). Accordingly, it can be seen that the use of nylon fiber components in wick structures can provide relatively high fluid flow rates without the use of enhancing additives. In the bicomponent fiber structures of the present invention, at least some of the exposed fiber surfaces that form capillary boundaries are provided by the polyamide fiber component of the bicomponent fibers. In wicks formed from sheath-core fibers with polyamide sheath components and wicks formed from side-by-side fibers having both components formed from polyamide materials, all of the exposed surfaces are provided by polyamides. In wicks formed from side-by-side fibers in which only one fiber component is a polyamide, the degree of natural capillary flow potential may be determined by the relative surface area presented by the polyamide component as compared to the surface area presented by the non-polyamide component.

It can thus be seen that the wick structures of the invention can provide a high degree of fluid flow potential. It can also be seen that, in embodiments incorporating sheath-core fiber types, the degree of flow potential is essentially independent of the volume of polyamide in the fiber sheath, as long as a sufficient fiber surface area of nylon is maintained. Accordingly, the amount of the polyamide material in the fiber may be minimized relative to a less expensive core material. Thus, the sheath-core fiber configuration can provide a significant advantage in that all of the exposed fiber surface may be established by a nylon sheath that forms only a fraction of the total fiber material. If surface energy were the only consideration, the wick fibers could be formed with the minimum polyamide material required for complete coverage of the core component.

There are, however, other considerations in selecting the amount and configuration of the polyamide fiber component. For example, for a given polyamide material, the ability of the bicomponent fibers to bond to form the self-sustaining wick bodies of the invention may be related to the amount of polyamide material used. This is particularly true for sheath-core fibers having a polyamide sheath. Also, as previously discussed, the use of crimped fibers and, in particular, self-crimped fibers, affects the flow transport properties of the wick because of its effect on uniformity of the bonded fiber structure and the tortuous flow paths formed thereby. As noted above, the crimping behavior of self-crimping fibers is generally a function, not only of the relative expansion (or contraction) behavior of the two fiber components, but also of the relative cross-sectional areas—and thus, the relative material amounts—of those components.

As a result, there may be, in some circumstances, an incentive to increase the amount of polyamide material in the bicomponent fiber beyond the minimum required to produce a particular polyamide material surface area. The amount of polyamide material used may thus be based on multiple design constraints including parameters based on surface energy requirements, structural uniformity and bondability. However, there is also likely to be a desire to minimize the amount of polyamide material required to meet these constraints. The present invention provides for tailoring the fiber geometry to meet one or more of these design criteria.

For a given polyamide material and fiber type, the flow surface area is essentially determined by the required fluid transfer performance. The remaining performance parameters may be related to the polyamide component ratio of the bicomponent fibers. As used herein, the term "polyamide component ratio" means the ratio of the weight per unit length (or volume) of polyamide material providing a polyamide surface for the capillaries of the wick to the overall weight per unit length (or volume) of the bicomponent fiber. It can be readily seen that in bicomponent fibers having a polyamide first fiber component and a non-polyamide second fiber component, the polyamide component ratio will be the ratio of the first component weight per unit length divided by the overall fiber weight per unit length. It can also be readily seen that a bicomponent fiber having a given polyamide sheath material and having a high polyamide component ratio may have a degree of surface energy and bondability but may also have a relatively high cost due to the high percentage of polyamide material. On the other hand, a fiber with a low polyamide component ratio may have a lower cost but may have bonding problems and may not provide a sufficient polyamide surface area. It should be noted that because some bicomponent fibers may have both components formed from polyamide materials, the polyamide component ratio may be as high as 1.0.

For a given bicomponent fiber type, the actual cross-sectional geometry of the fiber may be determined from a combination of the polyamide surface area requirements and the polyamide component ratio. If a self-crimping fiber is used, the crimping behavior may also be factored in.

Based on the above, it can be seen that a bicomponent fiber wick of the present invention may be optimally tailored for a particular combination of wick performance properties. The fluid transmissive body of the bicomponent fiber wick may be formed from a plurality of bicomponent fibers bonded to each other at spaced apart contact points. As in all the wicks of the invention, the fibers collectively define tortuous three dimensional fluid flow paths through the wick body. The bicomponent fibers have a fiber structure comprising first and second fiber components each having discrete cross-sectional areas extending continuously along the length of the bicomponent fiber. The fiber includes at least one polyamide material. Typically, the fiber will have a first component formed from polyamide material and a second component that is not, although in some embodiments, the second component may also be a polyamide material having different properties from the polyamide of the first component. The bicomponent fiber geometry may be specifically adapted to provide a polyamide component ratio that provides a final wick structure adapted to meet predetermined design requirements.

Although there may be some variation depending on the particular polyamide material being used, it has been determined that acceptable wicks may be produced from crimped bicomponent fibers having a polyamide component ratio in a range of about 0.10 to about 0.50. In a preferred embodiment, wicks may be produced from crimped bicomponent fibers having a polyamide component ratio in a range of about 0.20 to about 0.35. In a most preferred embodiment, wicks may be produced from crimped bicomponent fibers having a polyamide component ratio in a range of about 0.25 to about 0.30.

EXAMPLE

Wick structures were successfully formed from bicomponent fibers having different polyamide content levels and geometries. The processing methods previously discussed were used to produce wicks from self-crimped sheath-core bicomponent fibers in which the core fiber component was polyethylene terephthalate (Dupont 4441) and the sheath fiber component was nylon 6 (Ultramid BASF BS403N). The fibers were formed using conventional bicomponent melt spinning techniques using a spin pack with 288 individual filaments. The filaments were spun to 25 dpf (denier per filament) and individual packages were creeled to provide a final wick product of sufficient density. The collected yarns were drawn at a 3.5 draw ratio at 150-160° C. to induce a self-crimped fiber structure. The yarns were then passed through an oven at 200-235° C. and drawn through a heated die to form a self-sustaining wick structure having a 2.45 mm by 11.5 mm rectangular cross-section. The continuous wick structure was then cut in 44 mm lengths.

Two sets of wicks were produced, both having an outer fiber diameter of 38 microns. In the first set, the wick fibers were formed with a core diameter of 29.4 microns and an eccentricity of 0.45, in order to produce a polyamide component ratio of 0.40. In the second set, the wick fibers were formed with a core diameter of 32.9 microns and an eccentricity of 0.27, in order to produce a polyamide component ratio of 0.25. Both wick sets provided fully bonded self-sustaining, fluid transmissive bodies with substantially similar fluid transmission properties far in excess of conventional untreated bicomponent fiber wicks.

The wicks of the invention have a wide applicability and may be used in any fluid transfer application. They are particularly adapted for use in assay devices such as may be used in medical applications. Thus, for example, the wicks of the present invention can be used for the transport of virtually any analyte fluid, including biological analyte fluids such as urine, blood, and saliva. Moreover, the wicks of the invention may be used in assay devices for detecting one or more analytes including, but not limited to, hormones such as human chorionic gonadotropin (hCG) frequently used as a marker for pregnancy, antigens, enzymes, antibodies to HIV, antibodies to HTLV, antibodies to *Helicobacter pylori*, antibodies to hepatitis, antibodies to measles, hepatitis antigens, antibodies to terponemes, antibodies to host or infections agents, cellular markers of pathology including, but not limited to, cardiolipin, lecithin, cholesterol, lipopolysaccharide and sialic acid, antibodies to mumps, antibodies to rubella, cotinine, cocaine, benzoylecgonine, benzodizazpines, tetrahydrocannabinol, nicotine, ethanol theophylline, phenytoin, acetaminophen, lithium, diazepam, nortriptyline, secobarbital, phenobarbital, theophylline, testosterone, estradiol, 17-hydroxyprogesterone, progesterone, thyroxine, thyroid stimulation hormone, follicle stimulating hormone, luteinizing hormone, transforming growth factor alpha, epidermal growth factor, insulin-like growth factor I and II, growth hormone release inhibiting factor, IGA and sex hormone binding globulin; and other analytes including glucose, cholesterol, caffeine, cholesterol, corticosteroid binding globulin, PSA, or DHEA binding glycoprotein.

While the foregoing illustrates and describes exemplary embodiments of this invention, it is to be understood that the invention is not limited to the construction disclosed herein. The invention can be embodied in other specific forms without departing from the spirit or essential attributes.

What is claimed is:

1. A bicomponent fiber wick for use in processing an analyte fluid, the bicomponent fiber wick comprising:
    a self-sustaining fluid transmissive body formed from a plurality of bicomponent fibers bonded to each other at spaced apart contact points, the bicomponent fibers collectively defining tortuous fluid flow paths through the fluid transmissive body, wherein each bicomponent fiber has a fiber structure comprising first and second fiber components, each having discrete cross-sectional areas extending continuously along the length of the bicomponent fiber, the first fiber component being formed from a polyamide material, the fiber structure being adapted to provide a predetermined polyamide component ratio,
    wherein the first fiber component forms a continuous bicomponent fiber sheath along the length of the bicomponent fiber and the second fiber component forms a continuous bicomponent fiber core surrounded by the sheath.

2. A bicomponent fiber wick according to claim 1 wherein the polyamide material is selected from the group consisting of nylon 6, nylon 6,6, nylon 4, nylon 6,10, nylon 11, and nylon 12, and copolymers thereof.

3. A bicomponent fiber wick according to claim 1 wherein the second fiber component comprises at least one of nylon 6, nylon 6,6, polyethylene terephthalate, polybutylene terephthalate, polypropylene terephthalate, polylactic acid, polypropylene and polyethylene wherein the second fiber component is different from the first fiber component.

4. A bicomponent fiber wick according to claim 1 wherein the analyte fluid is one of urine blood, serum and saliva.

5. A bicomponent fiber wick according to claim 1 wherein the bicomponent fibers are self-crimped.

6. A bicomponent fiber wick according to claim 1 wherein the predetermined polyamide component ratio is in a range of about 0.10 to about 0.50.

7. A bicomponent fiber wick according to claim 1 wherein the predetermined polyamide component ratio is in a range of about 0.20 to about 0.35.

8. A bicomponent fiber wick according to claim 1 wherein the predetermined polyamide component ratio is in a range of about 0.25 to about 0.30.

9. A bicomponent fiber wick according to claim 1 wherein the self-sustaining fluid transmissive body is a three dimensional structure having a constant geometric cross-section.

* * * * *